United States Patent
Takeuchi et al.

(10) Patent No.: US 7,728,718 B2
(45) Date of Patent: Jun. 1, 2010

(54) LIGHTING SYSTEM FOR VEHICLE AND VEHICLE INCORPORATING SAME

(75) Inventors: Yoshiaki Takeuchi, Saitama (JP); Tetsuya Kondo, Saitama (JP); Ryohei Kitamura, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 253 days.

(21) Appl. No.: 11/980,189

(22) Filed: Oct. 30, 2007

(65) Prior Publication Data

US 2008/0150708 A1 Jun. 26, 2008

(30) Foreign Application Priority Data

Dec. 26, 2006 (JP) ............................. 2006-349487

(51) Int. Cl.
*B60R 25/10* (2006.01)
(52) U.S. Cl. ............... 340/426.1; 340/463; 340/468; 340/471; 340/475; 340/478
(58) Field of Classification Search .............. 340/426.1, 340/475, 463, 465, 468, 471, 478; 307/10.1, 307/10.8, 112; 315/77, 78, 82, 83
See application file for complete search history.

(56) References Cited

U.S. PATENT DOCUMENTS 4,087,784 A * 5/1978 West ........................ 340/471
4,354,174 A * 10/1982 Heidman, Jr. ............ 340/426.3
7,482,756 B2 * 1/2009 Kesterson ..................... 315/82
7,498,927 B1 * 3/2009 Kaji et al. ................ 340/426.1
7,532,108 B2 * 5/2009 Sugie et al. .............. 340/426.1

FOREIGN PATENT DOCUMENTS

JP          2706605          10/1997

\* cited by examiner

*Primary Examiner*—Hung T. Nguyen
(74) *Attorney, Agent, or Firm*—Carrier, Blackman & Associates, P.C.; William D. Blackman; Joseph P. Carrier

(57) ABSTRACT

The lighting system having a plurality of winker lamps disposed on front and rear portions of a vehicle body, a winker switch, and a lighting control circuit which performs changeover function allowing the winker lamps at a front portion of the vehicle body to lit as position lamps. The lighting control circuit is connected to a battery through an ignition switch. The lighting system further includes a power supply circuit which supplies, in an ignition off state, power to the lighting control circuit in response to an output signal from an antitheft apparatus to cause the winker lamps to light up or flicker. The output terminal of the antitheft device is connected to an electrical connection formed between the winker switch and the left and right rear lamps.

17 Claims, 6 Drawing Sheets

FIG. 5                                    PRIOR ART

LIGHTING SYSTEM FOR VEHICLE AND VEHICLE INCORPORATING SAME

CROSS-REFERENCE TO RELATED APPLICATIONS

The present application claims priority under 35 USC §119 based on Japanese patent application No. 2006-349487, filed on Dec. 26, 2006. The entire subject matter of this priority document is herein incorporated by reference.

BACKGROUND OF THE INVENTION

1. Field of the Invention

The present invention relates to a lighting system for a vehicle, such as a motorcycle. More particularly, the present invention relates to a vehicle lighting system having reduced number of parts and simplified structure including application of a single filament bulb as a winker lamp and a position lamp.

2. Description of the Background Art

There are known lighting systems for vehicles, such as motorcycles, in which a single filament bulb is sometimes used as both of a winker lamp and a position lamp. In these systems, when the single filament bulb is operated as a winker lamp, current is supplied at a duty ratio of 100% to the single filament bulb, but when the single filament bulb is operated as a position lamp, current is supplied at another duty ratio of 25% to the single filament bulb thereby making it possible to achieve two functions using a single lamp. The lighting changeover between a winker lamp and a position lamp is performed by operation of a relay.

An example of such a known lighting system, having a single filament bulb used as both of a winker lamp and a position lamp, is disclosed in the Japanese Patent No. 2706605.

As shown in FIG. 5 of this application, a lighting system 100 of the Japanese Patent No. 2706605 includes a left front lamp FL, a left rear lamp RL, a right front lamp FR, a right rear lamp RR, a left indicator lamp INDL and a right indicator lamp INDR, a position winker relay (a relay unit) 110, a winker hazard holding relay 120, a winker switch 130, and a hazard switch 140. The left front lamp FL and the right front lamp FR are used as winker lamps as well as position lamps.

In the system of the Patent Document No. 2706605, on an electrical connection line which interconnects the hazard switch 140 and the left rear lamp RL, right rear lamp RR left front lamp FL, and right front lamp FR, four diodes D1, D2, D3 and D4 are respectively provided. For example, a diode D1 is operatively disposed on an electrical connection between the hazard switch 140 and the left rear lamp RL. Further, the position winker relay 110 includes an Integrated Circuit (IC) 111 for exclusive use as a lighting control section, a left front driver 112, a right front driver 113 and a rear driver 114.

When an ignition switch is on, current is selectively supplied from a vehicle-carried battery (not shown) to the left front lamp FL, left rear lamp RL, right front lamp FR and right rear lamp RR in response to changeover of the winker switch 130 or the hazard switch 140.

The left front lamp FL, left rear lamp RL, right front lamp FR and right rear lamp RR are in the form of a single filament bulb. In the lighting system of the Japanese Patent No. 2706605, lighting for a position lamp is performed when no input is provided to the left and right rear lamps RL, RR, but flickering for a winker lamp is performed when an input is provided to one of the left and right rear lamps RL, RR. In this instance, if an intermittent input is provided to both of the left and right rear lamps RL, RR for hazard indication, then flickering for a winker lamp and lighting for a position lamp are performed simultaneously, and lighting in a glimmering state is provided.

Thus, in order to make it possible to definitely distinguish flickering or lighting of winker lamps and position lamps and indication of hazard lamps, the position winker relay 110 and the winker hazard holding relay 120 are used for single filament bulb lighting so that lighting for hazard lamps can be performed.

In the lighting system as shown in FIG. 5, since two different relays (having different specifications from each other), that is, the position winker relay 110 and the winker hazard holding relay 120 are used, the management of the lighting system becomes complicated as the increased number of parts are required for such systems. Particularly, the IC 111 for exclusive use included in the position winker relay 110 makes an obstacle to standardization of parts. Further, it is necessary to used four large capacity diodes D1, D2, D3 and D4, through which current from the battery flows, and such large capacity diodes may be expensive and may impose assembling problems.

Therefore, there is a need for a lighting system for a vehicle which does not require a winker hazard holding relay or a diode of a large current capacity to improve the layout performance and which allows further standardization of components. Accordingly, in view of the above-mentioned drawbacks of the known lighting systems, it is an object of the present invention to provide a simplified vehicle lighting system requiring reduced number of components.

SUMMARY OF THE INVENTION

In order to achieve the aforementioned object, the present invention according to a first aspect provides a lighting system for a vehicle, such as a motorcycle, having a plurality of winker lamps of the single filament bulb type provided at left and right portions of a front portion and a rear portion of a vehicle body, a winker switch, and a lighting control circuit having a changeover function which allows those of the winker lamps which are provided at the front portion of the vehicle body to light up as position lamps. The light system has a first characteristic in that the lighting system includes a power supply circuit which supplies power to the lighting control circuit in response to an output from an alarm apparatus, such as an antitheft device, operatively connected between the winker switch and those of the winker lamps which are provided at a rear portion of the vehicle in an ignition off state causing the winker lamps to light up or flicker.

Further, the present invention according to a second aspect provides the lighting system for a vehicle having the lighting control circuit connected to a battery through an ignition switch, and upon receiving an output signal from the alarm apparatus, the battery is connected to the lighting control circuit through the power supply circuit without the intervention of the ignition switch.

Furthermore, the present invention according to a third aspect provides the lighting system having the lighting control circuit including a microcomputer and a switching element which operates in accordance with an instruction of the microcomputer, and the switching element which causes the winker lamps to indicate as hazard lamps in response to operation of the hazard switch.

Effects of the Invention

In the present invention, according to the first aspect, the power supply circuit operates in response to the output from the alarm apparatus to the lighting control circuit. Accordingly, in an ignition off state of the ignition switch, by activating the lighting control circuit in response to the alarm apparatus output, the winker lamps can be caused to light up or flicker to produce alarm.

Since the lighting control circuit operates normally to control the winker lamps to light up or flicker in this manner, current is not supplied from the power supply such as a battery directly to all winker lamps. Accordingly, the system can be simplified because elimination of requirement of any no-return diodes of large current capacity which is used in order to cause a winker lamp to be selectively lit directly by a battery or the like upon alarming.

In the present invention, according to the second aspect, the lighting control circuit connected to the power supply such as a battery through the ignition switch is not biased in an ignition off state of the ignition switch. Therefore, in an ignition off state, the battery or the like is connected to the power supply circuit such that the power supply such as a battery can be connected to the lighting control circuit through the power supply circuit in response to a trigger of the alarm apparatus. Accordingly a large current capacity diode that are externally connected can be omitted since upon alarm indication, the winker lamps caused to light up or flicker similar to ordinary winker indication.

Further, according to the third aspect of the present invention, the winker lamps can be changed over between winker indication and hazard indication in accordance with an instruction outputted from the microcomputer in response to operation of the winker switch and the hazard switch. Consequently, a hazard holding relay is not required and thus it can be omitted from the system.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
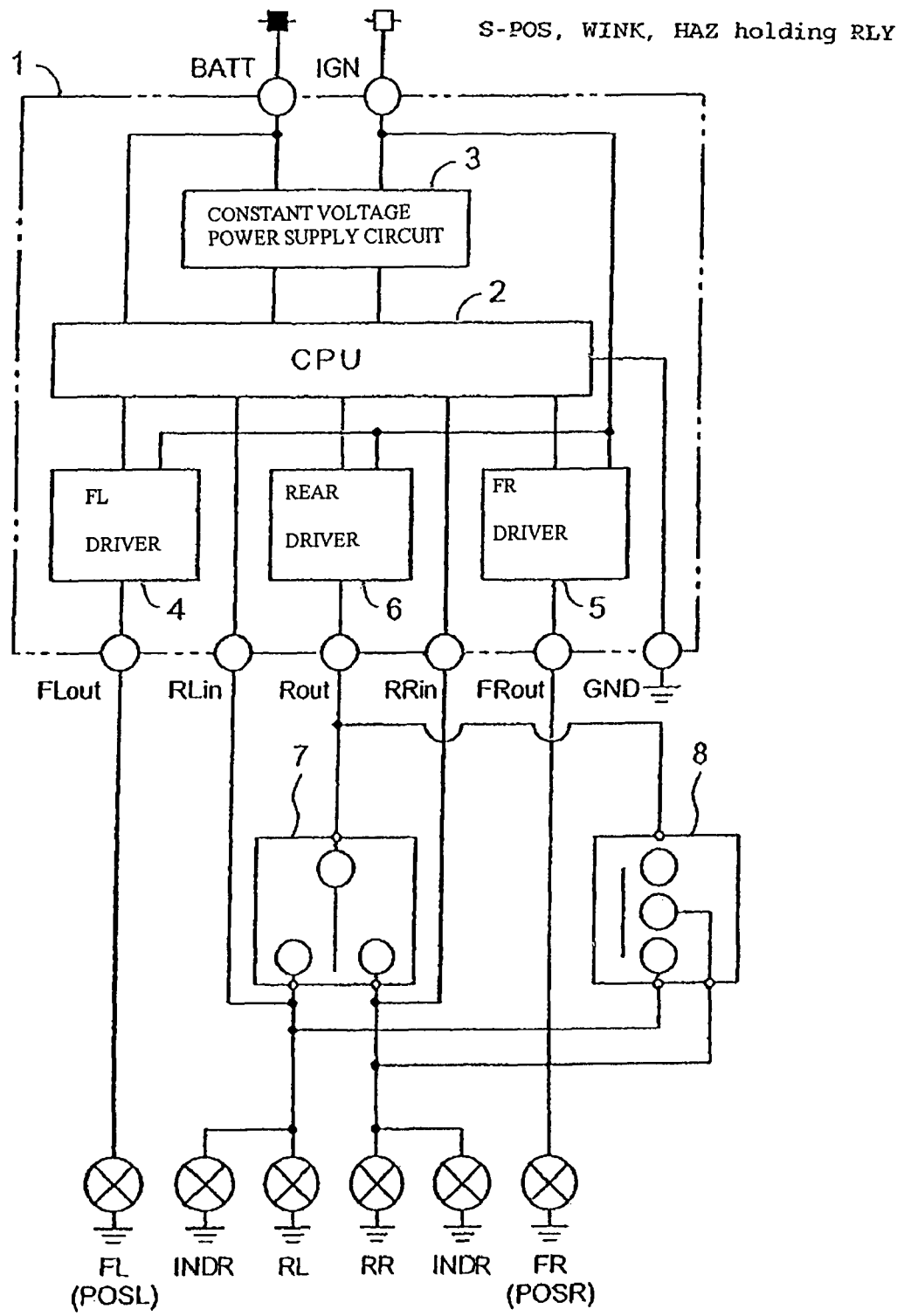
FIG. 1 is a system diagram of a lighting system according to a first embodiment of the present invention.
Figure 6:
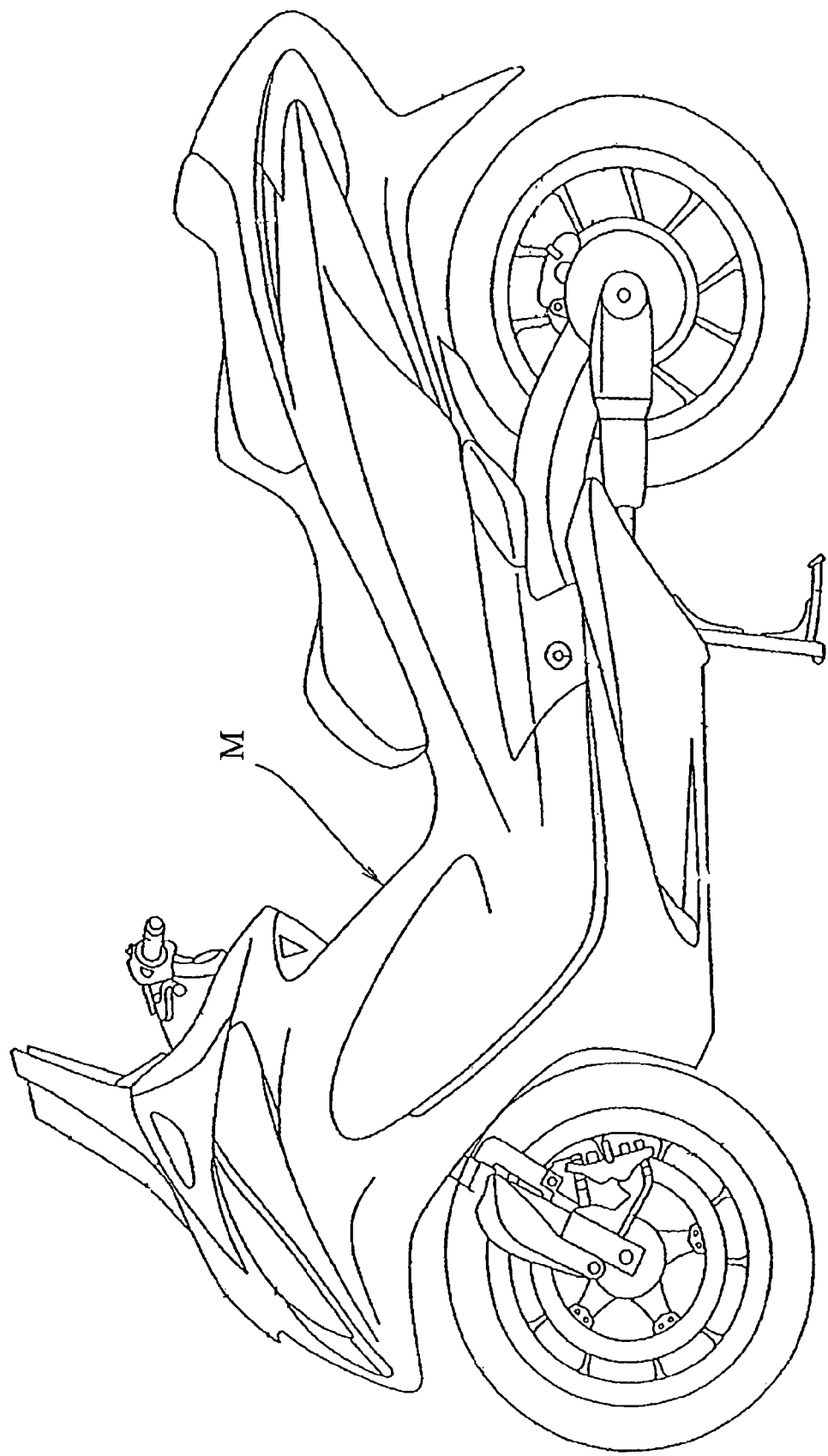
FIG. 6 is a vehicle (motorcycle) which incorporates the systems described in FIGS. 1-4.

In the following, an embodiment of the present invention is described with reference to the drawings. FIG. 1 is an electrical circuit diagram showing a lighting system for a vehicle according to an embodiment of the present invention. FIG. 6 is a vehicle (motorcycle) which incorporates the systems described in FIGS. 1-4.

Figure 5:
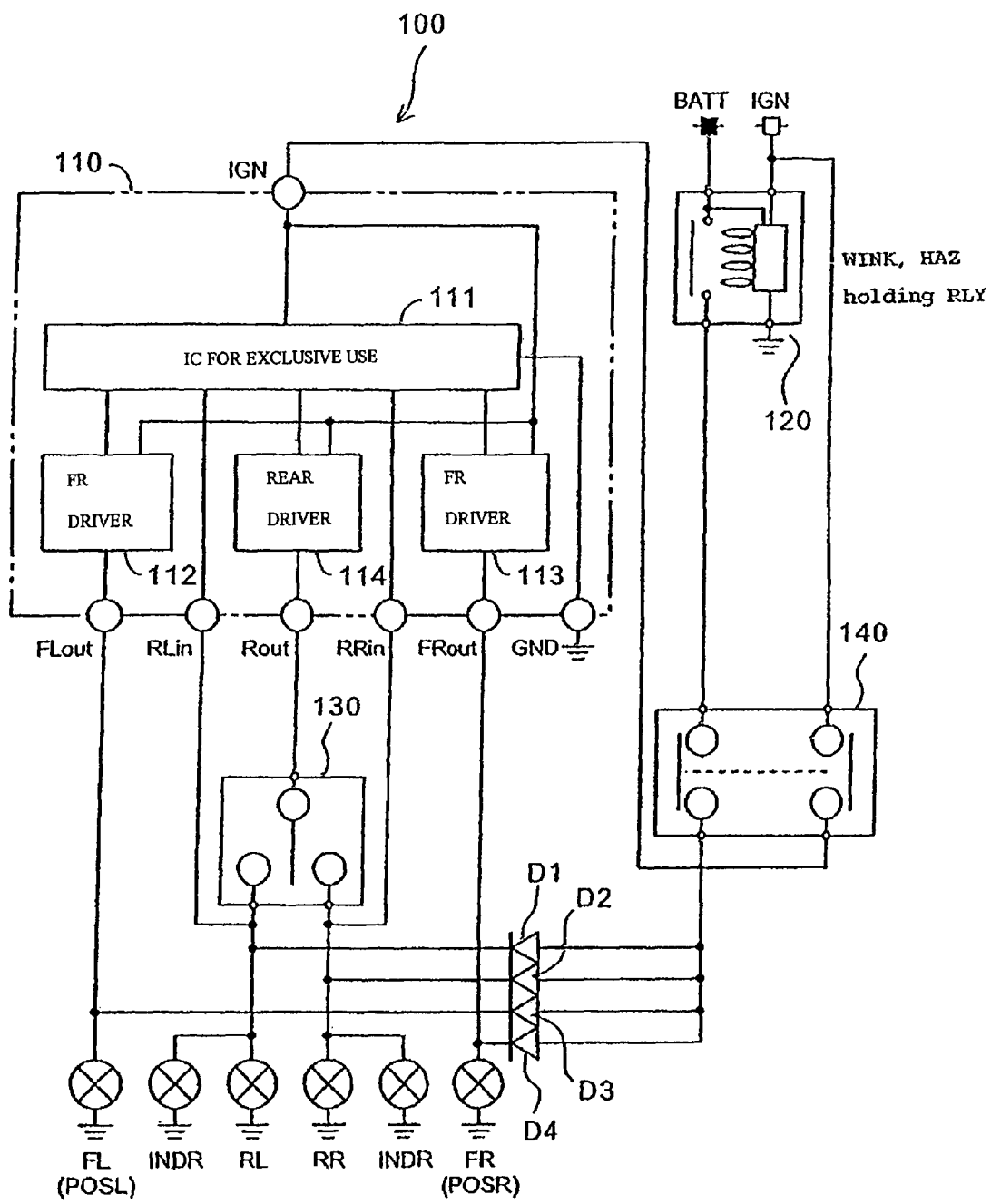
FIG. 5 is a block diagram showing an example of a lighting system according to an existing system.

Referring to FIG. 1, winker lamps used commonly as hazard lamps are single filament bulbs and are denoted with similar reference numerals/symbols as shown in FIG. 5, discussed hereinabove in the background section. It may be noted that the left front lamp FL is used also as a left position lamp, and the right front lamp FR is used also as a right position lamp. The lighting system includes a relay unit 1, which functions as a lighting control circuit, having a microcomputer (a Central Processing Unit (CPU)) 2, a constant voltage power supply circuit 3 for the CPU 2, a left front driver 4, a right front driver 5 and a rear driver 6. The CPU 2 operates as a changeover function unit, as discussed later.

A battery terminal BATT and an ignition terminal IGN are provided on the relay unit 1, and current is supplied from a vehicle-carried battery (not shown) to the relay unit 1 through the terminals BATT and IGN. It may be noted that the ignition terminal IGN is connected to the positive terminal of the battery through an ignition switch (not shown).

Each of the left front driver 4, the right front driver 5 and the rear driver 6 include a field effect transistor (FET). A drain side of the FETs of the left front driver 4, the right front driver 5 and the rear driver 6 is connected to the ignition terminal IGN. A source side of the respective FETs of the left front driver 4, the right front driver 5 and the rear driver 6 is connected to a left front output terminal FLout, a right front output terminal FRout and a rear output terminal Rout. Further, an input side (gate) of the respective EFTs of the left front driver 4, the right front driver 5 and the rear driver 6 is connected to the output side of the CPU 2.

The CPU 2 performs functions of both of an Integrated Circuit (IC) 111 for an exclusive use and the winker hazard holding relay 120 shown in FIG. 5, and supplies a driving signal in a predetermined frequency to the left front driver 4, the right front driver 5 and the rear driver 6.

When each single filament bulb is to operate as a position lamp, the CPU 2 outputs a lighting driving signal of, for example, 150 Hz so that the single filament bulb may be regarded as being continuously lit according to the sense of sight of a human being. The driving signal for a position lamp is set to a low duty ratio, for example, to a duty ratio of 25% in order to substantially reduce the supply current.

Then, where the single filament bulb is to operate as a winker lamp or a hazard lamp, a flickering driving signal of, for example, 85 cycles/minute is outputted so that flickering may be discriminated by the sense of sight of a human being. The flickering driving signal for a winker lamp or a hazard lamp is set to a high duty ratio, for example, to a duty ratio of 100%, different from that for a position lamp.

The left front output terminal FLout is directly connected to the left front lamp FL, and the right front output terminal FRout is directly connected to the right front lamp FR. The rear output terminal Rout is connected to a common terminal of a winker switch 7, and the winker switch 7 is further connected to the left rear lamp RL and the right rear lamp RR. Similarly, the rear output terminal Rout is connected to a hazard switch 8, and the hazard switch 8 is further connected to the left rear lamp RL and the right rear lamp RR.

The left indicator lamp INDL and the right indicator lamp INDR disposed at a meter section of the vehicle (motorcycle) so as to be recognized by the rider are disposed in parallel to the left rear lamp RL and the right rear lamp RR and are lit similarly to the left rear lamp RL and the right rear lamp RR, respectively.

Two output terminals of the winker switch 7 are connected to a left rear input terminal RLin and a right rear input terminal RRin of the CPU 2.

Operation of the lighting system of the first embodiment is described below.

If the ignition switch is switched on, then the battery is connected to the relay unit 1 and the CPU 2 is activated. At this time, the CPU 2 supplies a lighting driving signal of a low duty ratio to the left front driver 4 and the right front driver 5 so that the lamps may be lit as position lamps. The CPU 2 supplies a lighting driving signal of a high duty ratio to the rear driver 6 so that the lamps are lit as winker lamps.

When the winker switch 7 and the hazard switch 8 are not set on, only the left front driver 4 and the right front driver 5 are turned on in response to the lighting driving signal of the low duty ratio so that the left front lamp FL and the right front lamp FR are lit as position lamps.

Then, if the winker switch 7 is operated to the left rear lamp RL side for winker indication upon turning to the left, then the source of the rear driver (FET) 6 is connected to the left rear lamp RL. The CPU 2 monitors the potential on the output side of the winker switch 7 through the left rear input terminal RLin and can detect based on the potential that the winker switch 7 is operated to the left rear lamp RL side. It is to be noted that it is stored into the CPU 2 that the winker switch 7 is operated to the left rear lamp RL side, and the storage is retained until the winker switch 7 is switched off.

If the CPU 2 detects that the winker switch 7 is operated to the left rear lamp RL side, then it changes over the output frequency of the driving signal being supplied to the left front driver 4 to another frequency of a flickering driving signal with which the flickering can be recognized by a human being. Consequently, the left front lamp FL and the left rear lamp RL flicker in a period for a winker lamp to perform left turning winker indication. Simultaneously, the left indicator lamp INDL is caused to flicker.

On the other hand, if the winker switch 7 is operated to the right rear lamp RR side in order to perform winker indication for turning to the right, then the CPU 2 detects based on the potential on the output side of the winker switch 7 detected through the right rear input terminal RRin that the winker switch 7 is operated to the right rear lamp RR side. It may be noted that it is stored into the CPU 2 that the winker switch 7 is operated to the right rear lamp RR side, and the storage is retained until the winker switch 7 is switched off.

If the CPU 2 detects that the winker switch 7 is operated to the right rear lamp RR side, then it changes over the output frequency of the driving signal being supplied to the right front driver 5 to another frequency of a flickering driving signal with which the flickering can be recognized by a human being. Consequently, the right front lamp FR and the right rear lamp RR flicker in a period for a winker lamp to perform left turning winker indication. Simultaneously, also the right indicator lamp INDR is caused to flicker. Thus, the CPU 2 functions as a changeover function unit.

It may be noted that, upon hazard indication, a lighting driving signal of a low duty ratio may be supplied continuously to the front lamp on the side on which the front lamp is not used for winker indication so that the front lamp may operate as a position lamp or the lighting driving signal may be stopped.

On the other hand, in the case of hazard indication, if the hazard switch 8 is switched on, then a flickering driving signal of the high duty ratio is supplied from the rear driver 6 to the left and right rear lamps RL, RR through the hazard switch 8. Then, the flickering driving signal is detected by the CPU 2 through the left rear input terminal RLin and the right rear input terminal RRin, and the CPU 2 changes over the driving signal to be inputted to the left front driver 4 and the right front driver 5 to a flickering driving signal of a high duty ratio for a winker lamp. In this manner, all lamps perform flickering operation as hazard lamps.

Now, a lighting system according to a second embodiment, which is further used as an answerback for an antitheft apparatus 9, is described below. The answerback signifies that, when an antitheft apparatus operates, flickering operation same as operation of a hazard lamp is performed.

Figure 2:
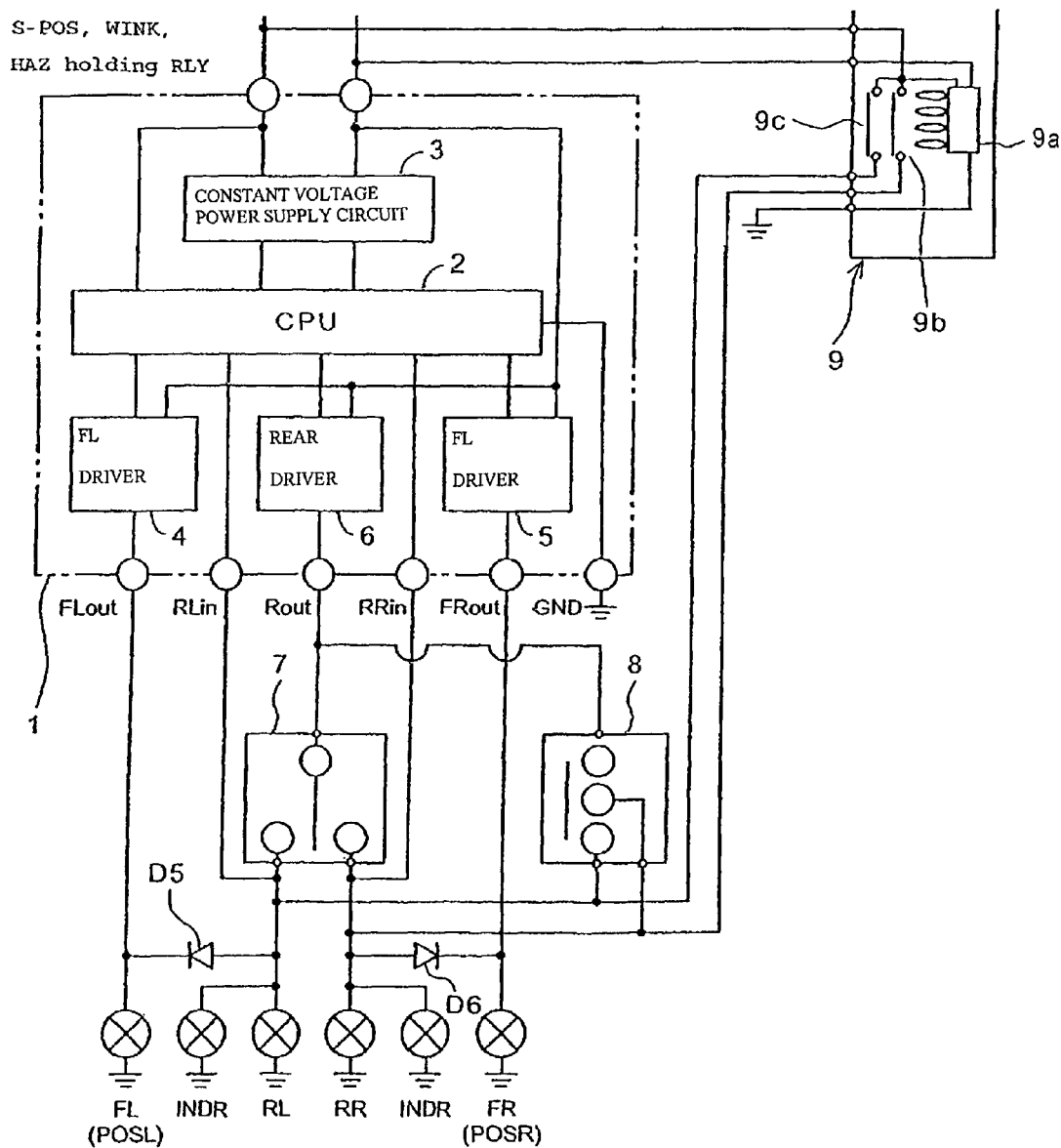
FIG. 2 is a system diagram of a lighting system according to a second embodiment of the present invention which includes an answerback for operation of an anti-theft apparatus.

FIG. 2 is a system diagram of a lighting system according to the second embodiment which is ready for the answerback for the antitheft apparatus 9. An antitheft apparatus 9 is connected to the output side of a hazard switch 8, that is, the antitheft apparatus 9 is operatively connected to the left rear lamp RL and the right rear lamp RR, and to the hazard switch 8.

The antitheft apparatus 9 is a flasher relay which has a coil 9a and contacts 9b, 9c connected to an oscillation circuit. The coil 9a of the antitheft apparatus is excited in a predetermined period upon theft detection to turn the contacts 9b, 9c on and off. The antitheft apparatus 9 decides the theft parameter based on the inclination of the vehicle body when the ignition switch is off and excites the coil 9a. As the antitheft apparatus 9, for example, a unit placed on the mark under the trade name of "Spyball" can be used.

If the theft parameter is detected by the antitheft apparatus 9, and the coil 9a is excited in a predetermined period, then the contacts 9b, 9c are turned on and off in the predetermined period. In response to the turning on and off of the contacts 9b, 9c, current flows cyclically from a battery connected to the antitheft apparatus 9 through the battery terminal BATT to the left rear lamp RL and the right rear lamp RR so that they flicker.

Simultaneously, current flows through the left front lamp FL and the right front lamp FR through diodes D5, D6 so that the left front lamp FL and the right front lamp FR flicker. As a result, an antitheft alarm can be issued upon the theft by similar operation. The diodes D5, D6 are provided to prevent the left rear lamp RL and the right rear lamp RR from being lit by the left front driver 4 and the right front driver 5 when the left rear lamp RL and the right rear lamp RR are lit as position lamps.

While the lighting system shown in FIG. 2 is simplified because of reduction of the number of relays, only two diodes D5, D6 are required in contrast to four diodes required in the prior art shown in FIG. 5. Therefore, in an embodiment described below, a lighting system is provided which reduced the number of relays. Also, large current capacity diodes may be eliminated.

The lighting system according to a third embodiment (FIG. 3), which may be used as an answerback for the antitheft device, is discussed below.

Figure 3:
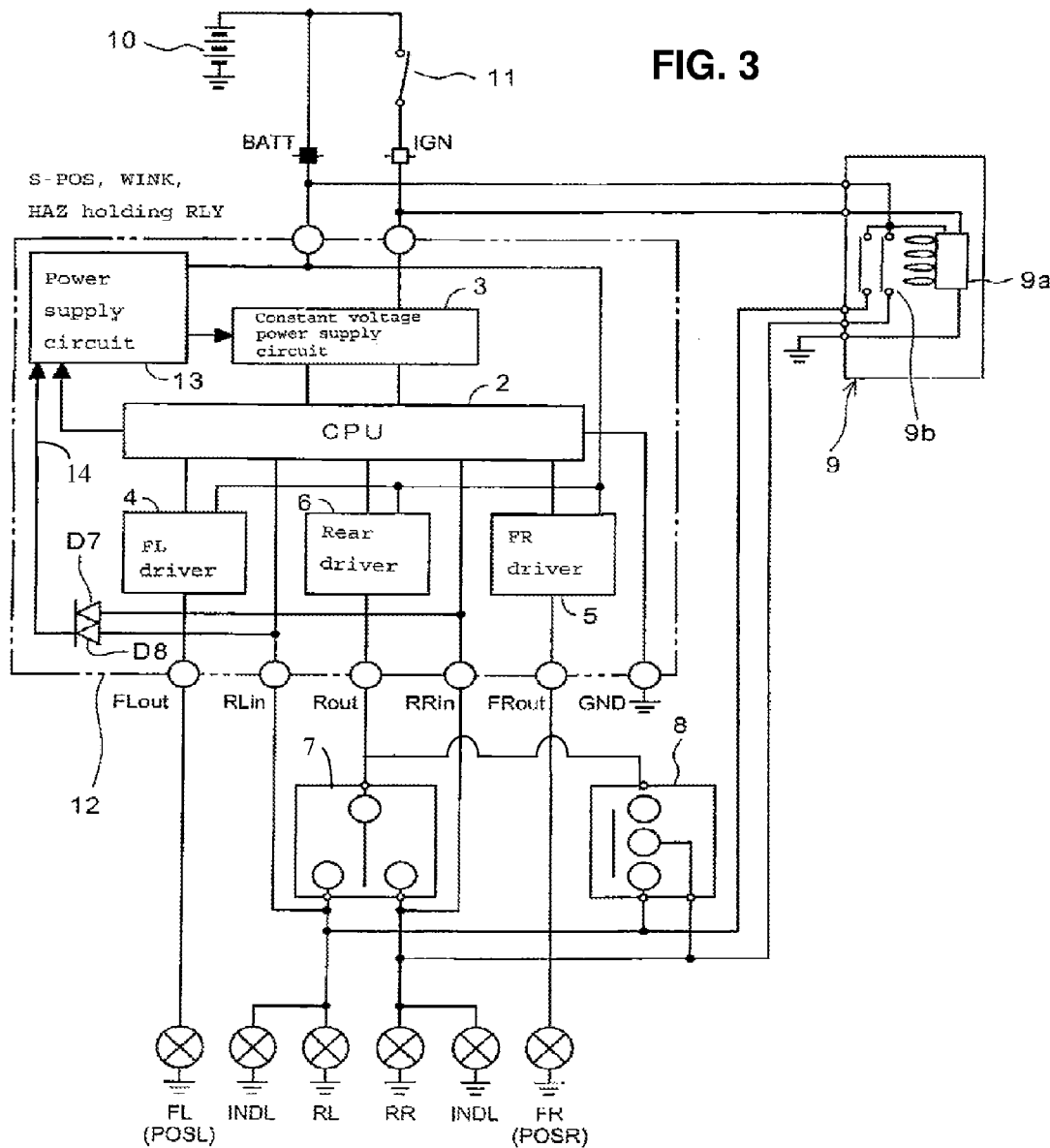
FIG. 3 is a system diagram of a lighting system according to a third embodiment of the present invention which is includes an answerback for operation of the anti-theft apparatus.

Referring to FIG. 3, a battery terminal BATT is connected to a battery 10, and an ignition terminal IGN is connected to the battery 10 through an ignition switch 11. The ignition terminal is also connected to the input side of the constant voltage power supply circuit 3. A relay unit 12, a lighting control circuit, is different from the relay unit 1 of the second embodiment (FIG. 2) in that it includes a power supply circuit 13 which operates to supply current from the battery 10 to the constant voltage power supply circuit 3 only when the ignition switch is off and diodes D7, D8 of a small current capacity disposed on a signal line 14, i.e. operatively connected thereto, as shown in FIG. 3.

The battery terminal BATT is connected to the left front driver 4, the right front driver 5 and the rear driver 6. The battery terminal BATT is also connected to the power supply circuit 13, which is connected to the constant voltage power supply circuit 3. The battery terminal BATT is also connected to the input side of the constant voltage power supply circuit 3 through a semiconductor switch (not shown) included in the power supply circuit 13. The output side of the constant voltage power supply circuit 3 is connected to the CPU 2.

The anode sides of the diodes D7, D8 is connected to a left rear input terminal RRin and a right rear input terminal RLin, respectively. The cathode sides of the diodes D7, D8 is connected to the power supply circuit 13.

In this configuration, when the ignition switch 11 is on, current is supplied from the battery 10 to the CPU 2 through the constant voltage power supply circuit 3 via the ignition switch 11. Further, current is supplied from the battery to the left front driver 4, the right front driver 5 and the rear driver 6 through the ignition switch 11. When the ignition switch 11 is on, operation of the left front lamp FL and the right front lamp FR as well as the left rear lamp RL and the right rear lamp RR, which is performed in response to operation of the winker switch 7 and the hazard switch 8 is similar to that described hereinabove in the embodiments disclosed in FIGS. 1 and 2.

On the other hand, in normal operation, when the ignition switch 11 is off, since the battery 10 is not connected to any of the left front lamp FL and the right front lamp FR as well as the left rear lamp RL and the right rear lamp RR, these lamps neither light up nor flicker.

However, if the antitheft apparatus 9 operates, then the left rear lamp RL and the right rear lamp RR flicker through the antitheft apparatus 9. When a potential is generated by the flickering, a voltage is applied to the power supply circuit 13 through one of the diodes D7, D8, and the switch in the power supply circuit 13 is switched on and a battery voltage is applied from the battery 10 to the constant voltage power supply circuit 3.

When the voltage is applied to the constant voltage power supply circuit 3, the CPU 2 starts its operation with a voltage (for example, a voltage of 5 V) outputted from the constant voltage power supply circuit 3.

After the CPU 2 starts its operation, the switch of the power supply circuit 13 is kept on in accordance with a driving signal from the CPU 2, and continuous current can be supplied to the CPU 2. Then, the CPU 2 detects from the potential at the left rear input terminal RLin and the right rear input terminal RRin that a voltage is applied from the antitheft apparatus 9 to the left rear lamp RL and the right rear lamp RR, and outputs a flickering driving signal in a period for hazard lamp indication to the left front driver 4 and the right front driver 5.

Consequently, upon operation of the antitheft device, also when the ignition switch 11 is off, hazard lamp indication can be performed to issue an alarm without using diodes of a large current capacity. It may be noted that an alarm by sound may be issued in addition to the hazard lamp indication.

Figure 4:
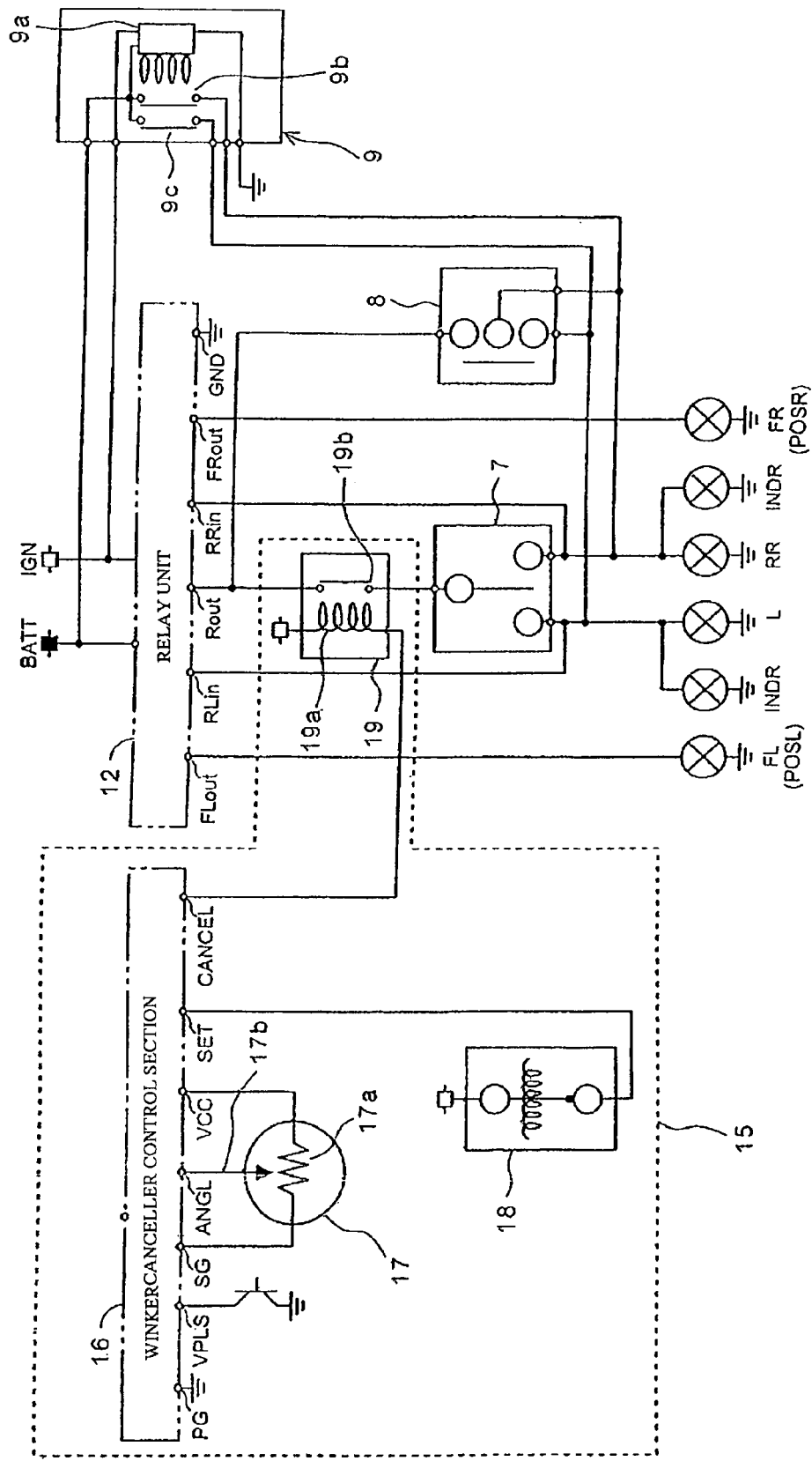
FIG. 4 is a system diagram of a lighting system according to a fourth embodiment of the present invention which is combined with a winker canceller and an anti-theft apparatus.

Now, a fourth embodiment of the present invention is described with reference to FIG. 4. The fourth embodiment includes a winker canceller 15. It may be note that details of a relay unit 12 (of FIG. 3) are omitted in the FIG. 4 for simplicity.

The winker canceller 15 includes a winker canceller control section 16, a steering angle sensor 17 for detecting the steering angle of the steering shaft of the vehicle (motorcycle), a set switch 18, and a cancel relay 19. The winker canceller control section 16 includes a vehicle speed input terminal VPLS for accepting a pulse signal of a period corresponding to the vehicle speed, a steering angle input terminal ANGL, a power supply voltage terminal Vcc, a set switch signal input terminal SET, a cancel signal output terminal CANCEL, a signal ground terminal SG and a power supply ground terminal PG.

The steering angle sensor 17 is connected to the steering angle input terminal ANGL, the power supply voltage terminal Vcc and the signal ground terminal SG The set switch 18 is connected to the set switch signal input terminal SET. Further, a coil 19a of the cancel relay 19 is connected to the cancel signal output terminal CANCEL. A contact 19b of the cancel relay 19 is interposed and connected between the rear output terminal Rout of the relay unit 12 and a common terminal of the winker switch 7. The steering angle sensor 17 may be of the type which supplies a divided voltage of the power supply voltage terminal Vcc extracted from the steering angle input terminal ANGL through a contact member 17b which slidably moves on a resistance member 17a formed, for example, annularly as a steering angle detection signal to the winker canceller control section 16.

Now operation the lighting system of the fourth embodiment is discussed.

When the rider of the vehicle operates the winker switch 7 to one of the left rear lamp RL and the right rear lamp RR in order to indicate changing traveling (advancing) direction of the vehicle, the set switch 18 is turned on in response to the operation of the winker switch 7. When the set switch 18 is turned on, the winker canceller control section 16 turns off the cancel signal. The winker canceller control section 16 includes an energizing switch (not shown) which is changed over so that the coil 19a of the cancel relay 19 may be energized when the cancel signal is off, and the contact 19b of the cancel relay 19 is closed in response to the turning off of the cancel signal. As a result, the relay unit 12 performs the operation described hereinabove with reference to FIGS. 1 to 3.

The steering angle sensor 17 outputs a steering angle detection signal in accordance with the steering operation amount of the vehicle, and the winker canceller control section 16 determines whether or not the advancing (turning) direction variation is completed based on the steering angle and the vehicle speed. If it is determined by the winker canceller control section 16 that the advancing direction variation is completed, then the winker canceller control section 16 turns on the cancel signal outputted from the cancel signal output terminal CANCEL to interrupt the energization of the coil 19a of the cancel relay 19. Consequently, the contact 19b of the cancel relay 19 is opened and the winker operation is stopped.

The embodiments described above are illustrative embodiments of the present invention. The present invention can be carried out in various modified forms. For example, the output of the antitheft apparatus 9 as an alarm output need not be connected between the winker switch 7 and the left and right rear lamps RL, RR but may be connected directly to the terminals RLin, RRin.

In summary, only it is necessary to use a construction that an alarm apparatus output is detected also in an ignition off state to turn on the power supply circuit so that power is supplied from a battery or the like to a lighting control circuit, that is, a relay unit, thereby to prevent current from being supplied directly from the battery or the like to lamps when an alarm is issued.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A lighting system for a vehicle, said lighting system comprising:
    a plurality of intermittently operable multi-function lamps, with at least one of said multi-function lamps provided at each of left and right portions of a front portion and a rear portion of a vehicle body, respectively, each of said multi-function lamps comprising a single filament bulb, wherein said multi-function lamps may selectively light up as position lamps, winker lamps, or hazard lamps and wherein each of said multi-function lamps is operable as a winker lamp or as a hazard lamp using said single filament bulb;
    a lighting control circuit which functions as a relay, said lighting control circuit operatively connected with said plurality of multi-function lamps; said lighting control circuit having a changeover function unit which allows said multi-function lamps which are provided at the front portion of the vehicle body to light up as position lamps, winker lamps or hazard lamps,
    wherein said system is operable to control operation of said multi-function lamps without requiring any additional relays other than said lighting control circuit;
    an antitheft apparatus operatively attached to said vehicle body and capable of generating an output signal under predetermined conditions;
    a winker switch operatively connected with the lighting control circuit; and
    a power supply circuit which supplies power to said lighting control circuit in response to an output signal from the antitheft apparatus, wherein power is supplied to said rear multi-function lamps through said antitheft apparatus causing said rear multi-function lamps to light up or flicker and power is supplied to said front multi-function lamps through said lighting control circuit causing said front multi-function lamps to light up or flicker in an ignition off state of an ignition switch of an engine of the vehicle,
    wherein the antitheft apparatus comprises an output terminal which is operatively connected to an electrical connection between said winker switch and said rear multi-function lamps.

2. The lighting system for a vehicle according to claim 1, wherein said lighting control circuit is connected to a battery through the ignition switch, and said battery is connected to said lighting control circuit through said power supply circuit without the intervention of said ignition switch upon receiving the output signal from the antitheft apparatus.

3. The lighting system for a vehicle according to claim 2, wherein
    said lighting system further comprises a hazard switch, and
    said lighting control circuit includes a microcomputer and a switching element which operates in accordance with an instruction of said microcomputer, and said switching element causes said multi-function lamps to function as hazard lamps in response to operation of said hazard switch.

4. The lighting system for a vehicle according to claim 2, wherein the output signal is a voltage output generated from the antitheft apparatus operatively connected to a vehicle-carried battery in response to theft detection operation in the ignition off state.

5. The lighting system for a vehicle according to claim 1, wherein
    said lighting control circuit is connected to a battery through the ignition switch, and
    upon the antitheft apparatus output, said battery is connected to said lighting control circuit through said power supply circuit without the intervention of said ignition switch.

6. The lighting system for a vehicle according to claim 5, wherein the output signal is a voltage output generated from the antitheft apparatus operatively connected to a vehicle-carried battery in response to theft detection operation in the ignition off state.

7. The lighting system for a vehicle according to claim 1, wherein
    said lighting system further comprises a hazard switch, and
    said lighting control circuit includes a microcomputer and a switching element which operates in accordance with an instruction of said microcomputer, and said switching element causes said multi-function lamps to function as hazard lamps in response to operation of said hazard switch.

8. The lighting system for a vehicle according to claim 1, wherein
    said lighting system further comprises a hazard switch, and
    said lighting control circuit includes a microcomputer and a switching element which operates in accordance with an instruction of said microcomputer, and said switching element causes said multi-function lamps to function as hazard lamps in response to operation of said hazard switch.

9. The lighting system for a vehicle according to claim 1, wherein the output signal is a voltage output generated from the antitheft apparatus operatively connected to a vehicle-carried battery in response to theft detection operation in the ignition off state.

10. The lighting system for a vehicle according to claim 1, wherein the output signal is a voltage output generated from the antitheft apparatus operatively connected to a vehicle-carried battery in response to theft detection operation in the ignition off state.

11. A lighting system for a vehicle, said lighting system comprising: a plurality of multi-function lamps disposed at a front portion and a rear portion of a vehicle body, respectively, each of said multi-function lamps comprising a single filament bulb;
    a lighting control circuit, which functions as a relay, operatively connected with said plurality of multi-function lamps;
    said lighting control circuit having microcomputer, and a changeover function unit which allows said multi-function lamps which are provided at the front portion of the vehicle body to selectively light up as position lamps, winker lamps, or hazard lamps, wherein said system is operable to control operation of said multi-function lamps without requiring any additional relays other than said lighting control circuit;

a winker switch operatively connected with the lighting control circuit; and said lighting control circuit having a power supply circuit which supplies power to said microcomputer in response to an output signal from an antitheft apparatus and causes said plurality of multi-function lamps to light up or flicker in an ignition off state of an ignition switch of an engine of the vehicle, wherein the antitheft apparatus includes an output terminal which is operatively connected to an electrical connection between said winker switch and said multi-function lamps which are provided at the rear portion of the vehicle body.

12. The lighting system for a vehicle according to claim 11, wherein the output signal is a voltage output generated from the antitheft apparatus operatively connected to a vehicle-carried battery in response to theft detection operation in the ignition off state.

13. In a vehicle of the type comprising a vehicle body, a battery, and an ignition switch in selective electrical communication with said battery, the improvement comprising a lighting system for the vehicle, said lighting system comprising:

a plurality of intermittently operable multi-function lamps, with at least one of said multi-function lamps provided at left and right portions of a front portion and a rear portion of the vehicle body, respectively, each of said multi-function lamps comprising a single filament bulb;

a lighting control circuit, which functions as a relay, operatively connected with said plurality of multi-function lamps; said lighting control circuit having a changeover function unit which allows said multi-function lamps which are provided at the front portion of the vehicle body to selectively light up as position lamps, winker lamps or hazard lamps, wherein said system is operable to control operation of said multi-function lamps without requiring any additional relays other than said lighting control circuit;

an antitheft apparatus operatively attached to said vehicle body and capable of generating an output signal under predetermined conditions;

a winker switch operatively connected with the lighting control circuit; and a power supply circuit which supplies power to said lighting control circuit in response to an output signal from the antitheft apparatus and causes said plurality of multi-function lamps to light up or flicker in an ignition off state of the ignition switch of the vehicle, wherein the antitheft apparatus includes an output terminal which is operatively connected to an electrical connection between said winker switch and said multi-function lamps which are provided at the rear portion of the vehicle body.

14. The lighting system for a vehicle according to claim 13, wherein:

said lighting control circuit is connected to the battery through the ignition switch, and said battery is connected to said lighting control circuit through said power supply circuit without the intervention of said ignition switch upon receiving the output signal from the antitheft apparatus.

15. The lighting system for a vehicle according to claim 13, wherein the lighting control circuit is connected to the battery through the ignition switch, and the battery is connectable to said lighting control circuit through said power supply circuit without the intervention of said ignition switch, in response to output from the antitheft apparatus.

16. The lighting system for a vehicle according to claim 13, wherein said lighting system further comprises a hazard switch, and said lighting control circuit includes a microcomputer and a switching element which operates in accordance with an instruction of said microcomputer, and said switching element causes said multi-function lamps to function as hazard lamps in response to operation of said hazard switch.

17. The lighting system for a vehicle according to claim 13, wherein the output signal is a voltage output generated from the antitheft apparatus operatively connected to the battery in response to a theft detection operation in the ignition off state.

* * * * *